United States Patent [19]

Bernhard et al.

[11] 4,234,372
[45] Nov. 18, 1980

[54] APPARATUS FOR AUTOMATICALLY SEALING INSULATION GLASS PANELS

[75] Inventors: Rudolf Bernhard; Hans Bonjour, both of Bützberg, Switzerland

[73] Assignee: Glasmatec AG, Thun, Switzerland

[21] Appl. No.: 17,030

[22] Filed: Mar. 2, 1979

[30] Foreign Application Priority Data

Mar. 2, 1978 [CH] Switzerland .................. 2781/78

[51] Int. Cl.³ .................. C03C 27/06; B32B 31/00
[52] U.S. Cl. .................. 156/356; 118/323; 156/109; 156/357; 156/362; 156/578
[58] Field of Search .................. 156/109, 107, 244.22, 156/500, 556, 566, 356, 562, 357, 292, 578, 362, 36, 363; 118/410, 323; 427/163, 164, 165; 264/261

[56] References Cited

U.S. PATENT DOCUMENTS

| 2,720,667 | 10/1955 | Naugler | 156/578 |
|---|---|---|---|
| 3,759,771 | 9/1973 | Battersby | 156/109 |
| 3,785,898 | 1/1974 | Gerber et al. | 156/353 |
| 3,886,013 | 5/1975 | Bowser et al. | 156/109 |
| 3,962,024 | 6/1976 | Stehl | 156/107 |
| 3,974,011 | 8/1976 | Jarchow et al. | 156/109 |
| 4,088,522 | 5/1978 | Mercier et al. | 156/109 |

Primary Examiner—Michael W. Ball
Attorney, Agent, or Firm—Brady, O'Boyle & Gates

[57] ABSTRACT

A nozzle movable into the edge seam around the periphery of an insulating glass panel is connected with a supply source of sealing compound and has a leading guide element also positioned in the edge seam and a leading side guide adapted to run over the inner surface of at least one of the two glass plates making up the panel, all of which are moved relative to the panel by a conveying device to uniformly fill the edge seam in a single pass with a sealing and insulation layer. A rotating device is connected with the nozzle so that the forward movement of the nozzle is stopped at every corner, the nozzle is rotated and then moved forward again to thus provide a continuous uninterrupted seal even at the corners of the insulation glass panel.

26 Claims, 20 Drawing Figures

APPARATUS FOR AUTOMATICALLY SEALING INSULATION GLASS PANELS

As is commonly known, insulation glass panels consist of at least two glass panels that are maintained at a certain distance from each other by a connecting element. The connecting element is generally a hollow section frame glued to the panels and filled with a hygroscopic medium, whose external measurement is smaller than that of the glass panels, so that an edge seam is created all around. That edge seam has to be sealed hermetically in order to prevent water vapor from penetrating into the space between the panels. For that purpose, the edge seam is sealed with a sealing compound.

Until presently the insulation glass panel used to be conveyed along two nozzles that were maintained at a well-determined distance from each other, whereupon it was moved between the nozzles that were aimed at a pair of rims, whereby both sides of the edge seam were filled with the sealing compound. The insulation glass panel was then further conveyed and rotated, and the other pair of rims were then conveyed between the two other nozzles. The sealing compound discharge through the nozzles was thereby constant and adjusted to such quantities that the sealing compound was applied excessively. That excess was then scraped off by a flexible polishing unit that was being moved along the sides of the glass panels. For instance, in the case of the well-known and documented processes DE-OS No. 25 44 301 and DE-OS No. 24 02 642, large quantities of the expensive sealing compound were used. Besides, the marginal areas of the outer surfaces of the insulation glass panel used to get smeared during the application and the scraping of the excess sealing compound, so that after completion of the sealing procedure they had to undergo an additional work procedure in order to be cleaned. The function of this invention is to automatically seal the edge seams of insulation glass panels with an approximately uniformly thick insulation layer over the panels' entire circumference, so that the insulation layer adheres closely to the spots that are to be insulated, especially the corners of the edge seam sectional areas, so that the sealing compound penetrates into possible gaps between the connecting element and the glass panels, and so that no sealing compound spills over the outer surface of the glass panels.

The insulation glass panel that is conveyed to the operation site, for instance by means of a rolling track, is preferably maintained there, whereupon the nozzle is brought from an inoperative position outside the conveyance path to its operating position along the edge seam and conveyed along the entire periphery of the insulation glass panel and is thereby immobilized at every corner and is rotated in its operating position in order to seal the next side of the edge seam. In this manner the entire edge seam is provided, in a single pass, with a dependable insulation coating that is not interrupted at the corners of the insulation glass panel. The preferred mechanism for the execution of this process, has the advantage, with respect to known mechanisms, that it saves a lot of space because the sealing procedure of the entire edge seam is carried out on a single site, and the insulation glass panel does not therefore have to be transported from one site where one pair of rims is sealed to a second site where the other rims are sealed, and it does not have to be rotated in the process. Another advantage of this type of execution consists in the use of a single nozzle, because the supply device of the sealing compound can be mounted in the immediate proximity of the nozzle. The thusly obtained shorter supply line makes it possible to accurately aim the sealing compound flow through the nozzle.

The following further describes instances of the execution of the mechanism, in conformity with the invention, by means of the attached drawings. Shown are.

Figure 1:
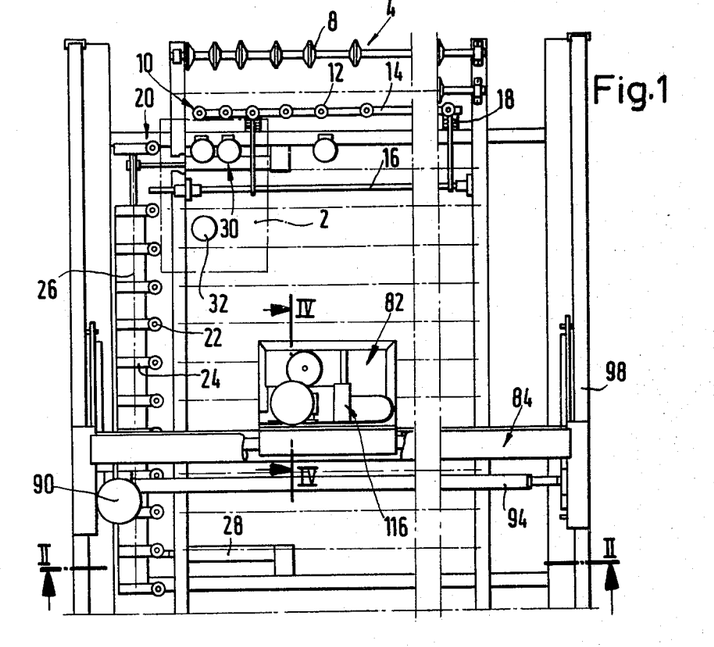
FIG. 1: A plan view of a mechanism for automatically sealing insulation glass panels.
Figure 2:
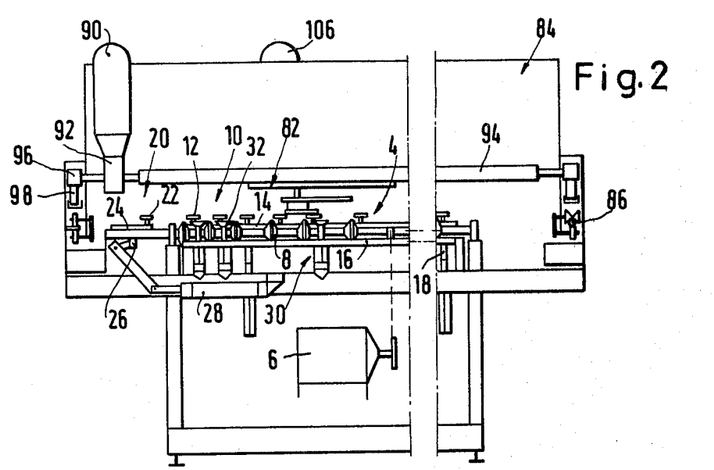
FIG. 2: a cross-section of the mechanisms through line II—II in FIG. 1.

The mechanism represented in FIGS. 1 and 2, which provides for the sealing of the insulation glass panels, one of which is indicated by a dash-dotted line in the upper left part of FIG. 1 and is designated by the digit 2, contains a conveying device 4 designed as a horizontal roller track, whose rollers 8 are driven by means of a driving device 6. The conveying device 4, of which only the part used in the sealing process at the operation site is represented in FIG. 1, conveys from time to time an insulation glass panel in FIG. 1 upward toward the operation site and moves it away from the operation site after completion of the sealing process. A positioning device, consisting of two impact devices 10 and 20, serves to position the insulation glass panel 2 at the operation site. The impact elements 12 of the impact device 10 are represented as rollers and are mounted on a rotating rail 14 around an axle 16, by means of a piston and cylinder unit 18. In one rotation position of the rail 14, the impact elements 12 project into the track of the conveying device 4 in such a way that the advancing edge of the insulation glass panel touches them and thereby becomes oriented in a predetermined position which is perpendicular to the direction in which it was being conveyed. In the other position, the impact elements 12 are swiveled outward from the conveying track. The impact elements 22 of the impact device 20, which are also represented as rollers, are mounted on rods 24, which in turn are mounted in a rotating position around axle 26 by means of a piston and cylinder unit 28. The function of the impact device 20, that swivels sideways in the track of the conveying device 4, is to position the insulation glass panel 2 transversely with respect to the conveyance direction.

Figures 3, 4:
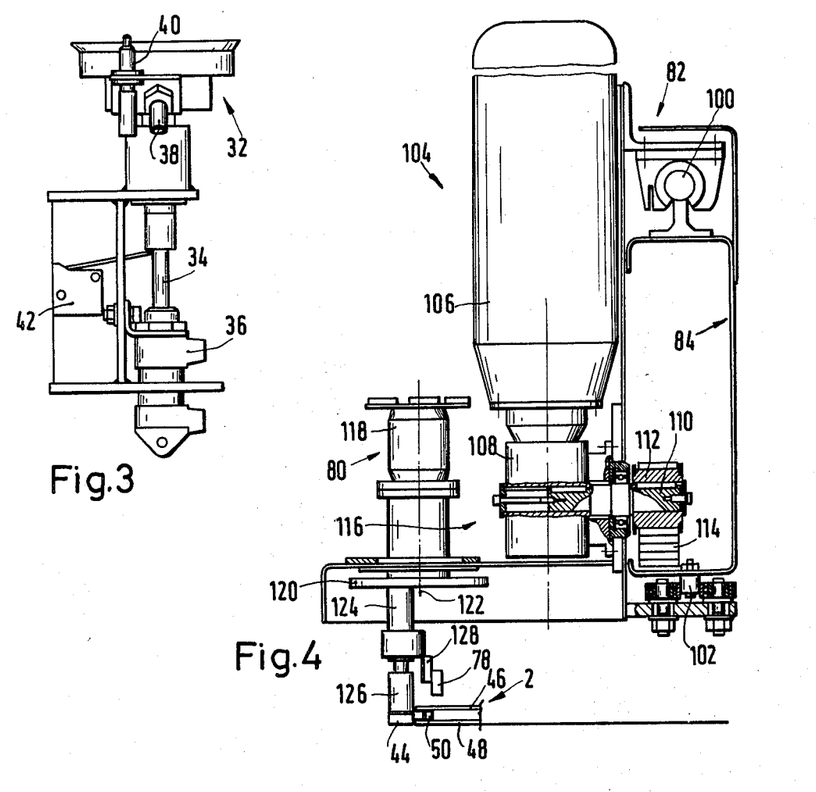
FIG. 3: a side view of a suction plate with its power device.
FIG. 4: a section through line IV—IV in FIG. 1.

A retaining device 30, that serves to immobilize the insulation glass panel 2 during the sealing procedure of the edge seam, is positioned between the two impact devices 10 and 20. The retaining device 30 shows four suction plates 32, each of which—as is illustrated in FIG. 3—can move up or down by means of a piston rod 34 of a piston and cylinder unit 36. Negative pressure can be applied to the suction plate 32 through a connection 38. It is further equipped with an upper end switch 40, that reacts to the presence of an insulation glass panel. If no insulation glass panel is present, then the end switch 40 causes the suction plate 32 to move downward and to reverse the negative pressure. A lower end switch 42 limits the downward motion.

Figure 5:
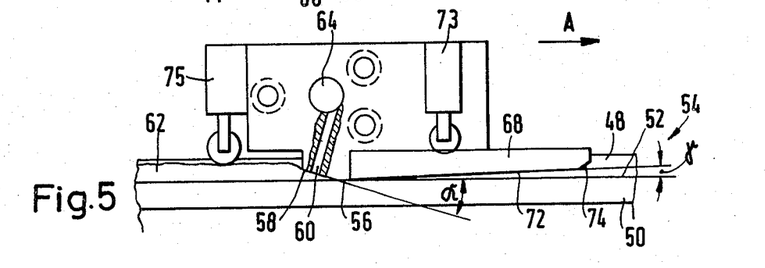
FIG. 5: a plan view of the nozzle with its guiding element inserted into the edge seam, in the mechanism as in FIG. 1, whereby the upper glass panel is omitted.
Figure 6:
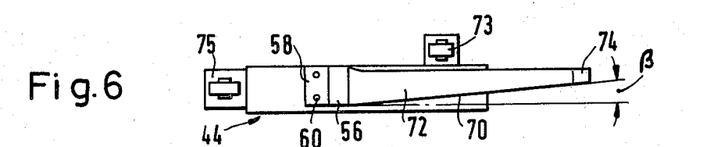
FIG. 6: the side of the nozzle facing the connecting element of the insulation glass panel, as in FIG. 5.

A nozzle 44 in operating position, represented in detail in FIGS. 4 to 6, engages into the edge seam 54 of the insulation glass panel 2, which consists of two single glass panels 46 and 48 and a connecting element that constitutes a frame with a hollow section 50, whose outer dimensions are smaller than those of the glass panels and which is glued to the glass panels by means of an adhesive layer. The nozzle 44 is equipped with a guiding element whose plane guiding surface 56 is positioned, in the operating position of the nozzle, against the side 52 of the connecting element 50 that borders on the edge seam 54. The guiding surface 56 changes into a ramp 58, located at the rear with respect to the feeding direction A, and which contains two outlets 60 to the nozzle 44. The ramp 58 has an inclination angle $\alpha$ of 10° to 25°, preferably 15°, with respect to the guiding surface 56, and it forms, together with the side 52 of the connecting element 50, a gap that widens toward the rear. The tubes of the nozzle 44 that end up in the outlets 60 are each positioned approximately in a perpendicular manner with respect to the ramp 58 and are each aimed at one of the two corners of the cross-section of the edge seam 54. The sealing compound 62 is supplied through a tube 64 whose diameter is larger than that of the tubes that open into the outlets 60 and that of the pipe 66 represented in FIG. 7.

As will be explained further, the flow of sealing compound 62 through the outlets 60 increases gradually at the beginning of each forward motion by the nozzle and decreases again gradually at the end. Both outlets 60 have been designed, on the one hand small enough so that the outflow speed of the sealing compound 62 is sufficiently high even with a smaller flow at the beginning and at the end of each advance of the nozzle 44, in order that the sealing compound 62 be squirted onto the areas that have to be sealed, in particular into both corners of the edge seam 54 cross-section. That causes the sealing compound 62 to adhere closely to the adhesive layer between the hollow section frame 50 and the glass panels 46 and 48 and to penetrate into any possible gaps that may occur in that adhesive layer. At the same time the sealing compound 62 is put under pressure inside the wedge-shaped space between the ramp 58 and the connecting element 50, so that it does not press against the bottom 52 and the walls of the edge seams.

On the other hand, the outlets 60 are obviously designed large enough, so that the required quantity of sealing compound 62 per time unit can flow through for an adequate insulation of the edge seam at maximum speed of the nozzle 44. The guiding element of the nozzle 44 has also an overrun pin 68 that precedes the guiding surface 56 in the conveying direction A, which is positioned at an angle $\beta$ of 2° to 10°, preferably 5°, with respect to the plane of the glass panel, i.e., the horizontally inclined overrun surface 70. The overrun pin 68 rises over the side of the lower glass panel 48 that borders on the edge seam 54 whenever the nozzle 44 moves as described further in connecton with FIGS. 11a and 11b, so that the nozzle 44 is lifted to a height dependent on the thickness of the glass panel 48 and steered sideways onto the edge seam whenever it is advancing in direction A. The open space 72 of the overrun pin 68 that is adjacent to the guiding surface 56 is positioned at an angle $\gamma$ of 1° to 3°, preferably 2°, with respect to the guiding surface 56. The overrun pin 68 is beveled at the front end 74.

The nozzle 44 has on one side a feeler 73 with a feeler wheel that runs over the front of the glass panel 46 and thus measures the depth of penetration of the nozzle 44 into the edge seam 54 and therefore the depth of the edge seam itself. The other side of the nozzle 44 is equipped with another feeler 75 that runs, with its feeler wheel, over the sealing compound 62 introduced into the edge seam 54 and that, accordingly, measures the thickness of the sealing compound layer. Both feeler wheels 73 and 75 can be parts of a single regulating device that controls the supply of sealing compound to the nozzle 44 in such a way that the thickness of the sealing compound layer 62 corresponds to the depth of the edge seam. That is particularly useful whenever it is necessary to completely fill different edge seams of varying depth or edge seams whose own depths may be at variance at different points. But the feelers 73 and 75 can also be used merely to determine the correct position of the nozzle 44 in the edge seam 54 and to control the thickness of the sealing compound layer.

Two probes 76 and 78, affixed to the nozzle 44, and adjusted to the insulation glass panel 2, are positioned one behind the other with respect to direction A. Those probes consist each of a light source beamed vertically onto the glass panels and a photo-detector that is triggered by the light reflected by the glass panels. The function of the probes 76 and 78—as is explained further—is to guide the advance motion of the nozzle 44 as well as the flow of the sealing compound through the nozzle 44.

The nozzle 44 is connected to a rotation device 80 that, in turn, is affixed to the carriage 82 of a motion device. The carriage can proceed in a direction corresponding to that of the traverse of a bridge 84 that is positioned perpendicularly to the direction of the motion of the device 4, and that bypasses the conveying device 4 and can thus continue in the same direction (FIGS. 1, 2 and 4).

The bridge 84 coasts over the rails 86 and can be passed by means of a propulsion device. The latter has a motor 90, preferably a direct current shunt motor, that is coupled over a transmission 92 to an axle 94 by means of which the propulsion is realized simultaneously on both rails 86, in order to ensure a precisely parallel advance of the bridge. The connection axle 94 has cog wheels 96 at both ends, that work together with a belt 98 mounted on the rails 86. End switches, which are not depicted, serve to limit the path of the bridge 84.

The carriage 82 that can be pushed over the bridge 84 is conveyed by an upper guiding rod 100 and lower guide rails 102. The carriage 82 has a motor 106 as propulsion device 104, which is preferably a direct current shunt motor, and which drives a transmission 108 over a piston 110 that supports a cog wheel 112.

The latter works in tandem with a belt 114 connected to the bridge. Next to the rotation device 80 the carriage 82 also supports a cog wheel pump 116 that functions as a dosage control device for the sealing compound 62.

The rotation device 80, represented in greater detail in FIGS. 4 and 7 to 9, has a motor 118 affixed to the carriage 82 that drives an index panel 120. A downward projecting bracket 124 is connected to the index panel, excentrically to the rotation axle 122. A mounting block 126, mounted axially on the bracket, supports the nozzle 44 as well as a bracket 128 for the probes 76 and 78. The conduit 66 for the sealing compound 62 is also affixed to the mounting block 126. A spring 130 serves to pre-tighten the swivel-mounted mounting block 126, and therefore the nozzle 44, against the connecting element 50. By connecting the nozzle 44 to the bracket 124 which is positioned excentrically with respect to the rotation axle 122, the nozzle 44 can be further conveyed by rotation around a corner of the insulation glass panel, and it therefore remains in contact with the edge seam.

Figures 7, 9:
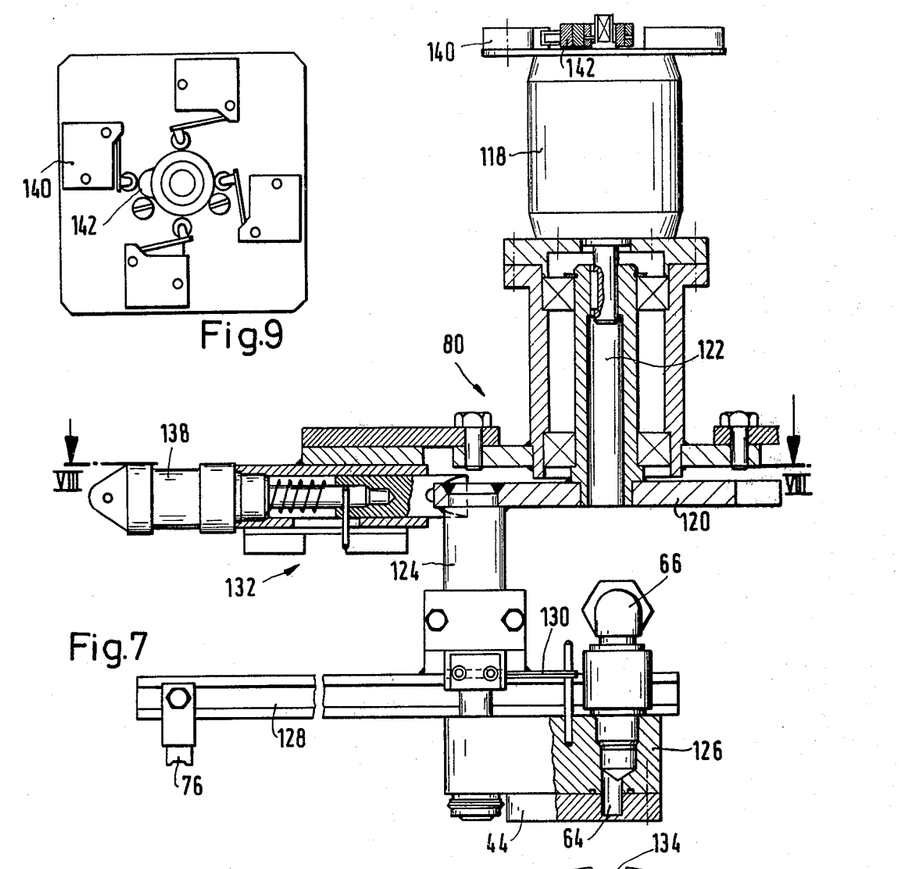
FIG. 7: a longitudinal section of a rotation and locking device, as in FIGS. 5 and 6.
FIG. 9: an end-switch layout of the rotation and locking devices according to FIGS. 7 and 8.
Figure 8:
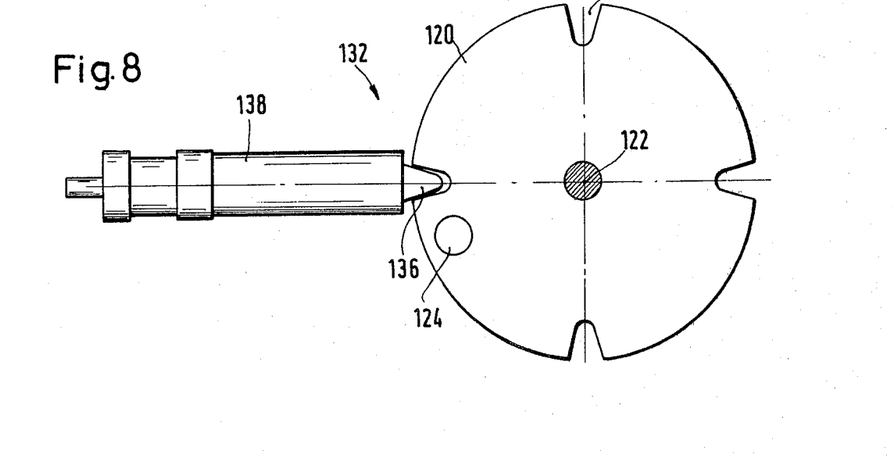
FIG. 8: a section of the rotation and locking device through line VIII—VIII in FIG. 7.

The rotation device 80 is equipped with a locking device 132, that contains the index panel 120, which has four notches 134 positioned at angles of 90° from each other. A notch tooth 136, which engages itself from time to time into those notches, is set in motion by means of a piston and cylinder unit 138. The rotation device 80 has also four end switches 140 that are positioned according to the four positions on the index panel 120 and that are triggered by a cam 142, which is affixed to the shaft of the motor 118. The function of the end switches 140 is to release the locking device from time to time by means of the notch tooth 136, as soon as the rotation device 80 has reached a new position.

Figure 10:
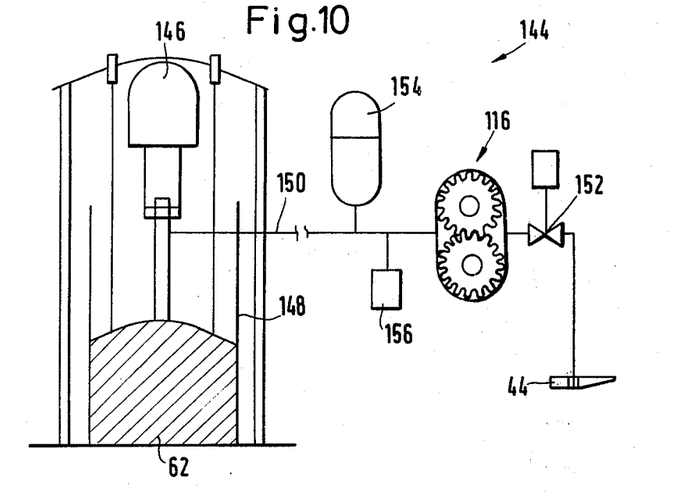
FIG. 10: a schematic representation of a supply device for the sealing compound.
Figure 13:
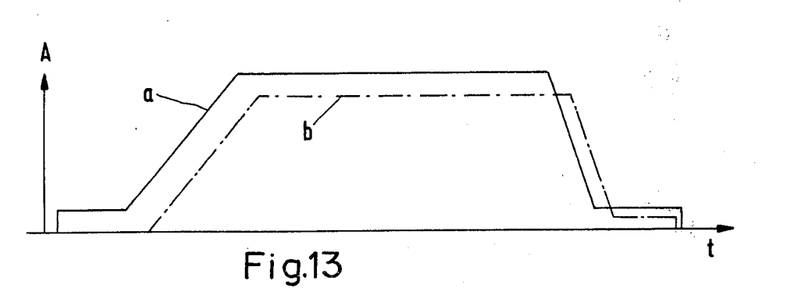
FIG. 13: a diagram of the time lapse of the steering dimensions for the conveying device and the supply device of the mechanism, according to FIG. 1.

FIG. 10 provides a schematic representation of the supply device 144 of the sealing compound. The supply mechanism consists first of a conveying device 146 in order to draw sealing compound 62 from a container 148 and to supply it to the pump 116 through a conduit 150. The pump 116 is connected to the nozzle 44 by a blocking valve 152. The function of the conveying device 146 is not only to feed the sealing compound, but also to convey it to the pump 116 under a positive pressure. A high pressure reservoir 154 can be provided to sustain and maintain the pressure (for instance 100 bar). A pressure gauge 156 monitors the pressure in the conduit 150. To drive the pump 116, use is made of a direct current shunt motor (not represented here) which, in order to increase the steering precision, is equipped with a governing device that covers the four quadrants of the speed-torque line (four-quadrant governing device). The driving motor of the pump 116 is governed by a program control device (not represented here), which also governs the motors 90 and 106 of the bridge 84 and the carriage 82, which are also equipped with four-quadrant governing devices in order to obtain a high level of steering precision. The program control device governs—as explained further by means of FIG. 13—the motor of the pump 116, subject to the relative speed of the nozzle 44 with respect to the edge of the insulation glass panel 2.

The mechanism functions as follows:

An insulation glass panel 2 that has to be treated is conveyed by means of a conveying device 4, whereby it is brought up to the impact device 10, whose impact elements 12 it touches. The impact device 20 is subsequently rotated sideways toward the insulation glass panel, so that the latter is in contact with both impact devices 10 and 20. The driving device 6 of the conveying device 4 is then switched off by the appropriate end switch, which also causes the suction plates 32 to be pulled away. Those suction plates 32, whose end switches 40 do not secure any insulation glass panels 2, are lowered and switched off from the negative pressure source. The remaining suction plates adhere closely to the insulation glass panel 2 and maintain it in the position determined by the impact devices 10 and 20. As soon as the insulation glass panel 2 is immobilized by means of the suction plates 32, the impact elements 12 and 22 of the impact devices 10 and 20 are withdrawn from the conveyance path.

Figure 11A:
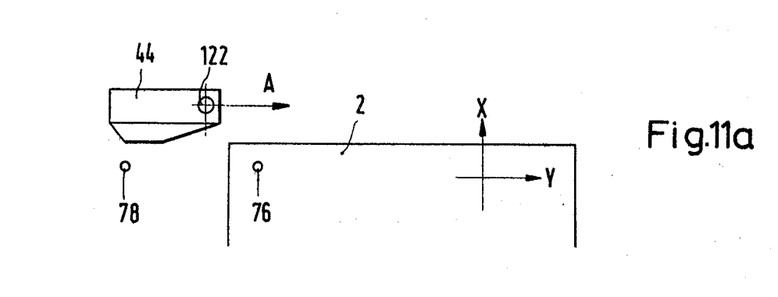
FIGS. 11a–11h: various positions of the nozzle, according to FIGS. 5 and 6, during the sealing process of the edge seam of an insulation glass panel.
Figure 11B:
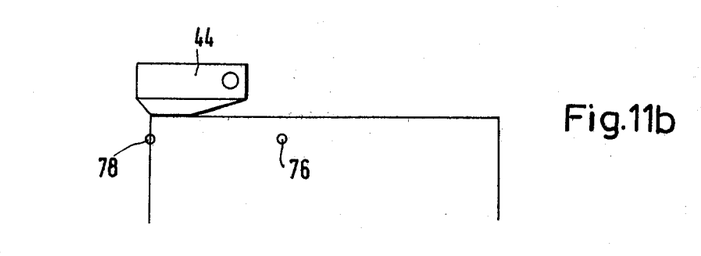

The nozzle 44 is in an inoperative position indicated by FIG. 11a, i.e., the bridge 84 and the carriage in FIG. 1 are respectively in an upper and left inoperative position (in FIG. 1 neither the bridge 84 nor the carriage 82, and therefore neither the nozzle 44, are in their inoperative positions). After the impact elements 12 and 22 of the impact devices 10 and 20 have been withdrawn, the probes 76 and 78, that are permanently affixed to the nozzle 44, are then switched on. The first probe 76 detects the insulation glass panel 2 and starts the motor 106 of the carriage 82. The latter, inching forward, conveys the nozzle 44 into the position depicted in FIG. 11b, whereby the overrun pin 68 overlaps over the inner side of the glass panel 48 that borders on the edge seam 54 and thus the guiding surface 56 is pressed onto the connecting element 50 by means of the spring 130. The second probe 78 now reaches the edge of the insulation glass panel in the position shown in FIG. 11b. The motor 106 is subsequently stopped by the signal given off by the probe 78 as it passes by the edge of the panel, whereupon the program control unit shown in FIG. 13, that governs the drive of the cog wheel pump 116 and the motor 106, is disengaged and the valve 152 opens. The time lapse of the steering dimension for the pump drive is indicated by an uninterrupted line in FIG. 13 and denoted by a, while that for the motor 106 is indicated by a dash-dotted line and denoted by b. On the chart, the amplitude A of the steering dimensions is charted on the ordinate and the time t on the abscissa. The control program is selected so that the quantity of sealing compound 62 applied per time unit—i.e., the flow of the compound 66 through the nozzle 44—and the relative speed of the nozzle with respect to the edge of the panel are gradually increased at the beginning of the motion, and gradually decreased at the end. Since the flow of sealing compound 62 through the nozzle 44 follows with a delay contingent upon the viscosity of the sealing compound, the motor 106 is started with a delay respective to the pump drive. The linear progression, previously step-wise, of the steering dimension a causes a quantity of sealing compound to be emitted that is sufficient to seal off the corner of the insulation glass panel. With the mutually proportional and gradual progression of the steering dimensions a and b, the flow of sealing compound through the nozzle 44 and its speed increase gradually in proportion with each other along the edge of the panel, whereupon the nozzle advances along the edge seam with constant speed (0.6 m/s) with a constant flow of the sealing compound.

Figure 11C:
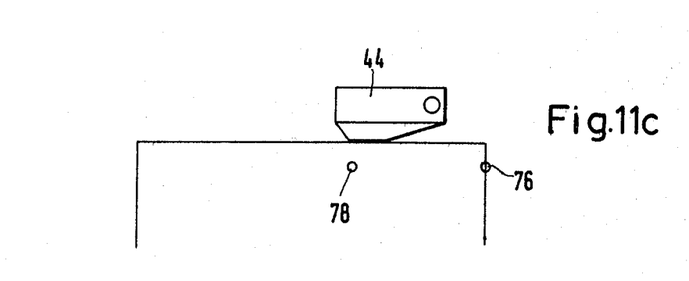
Figure 11D:
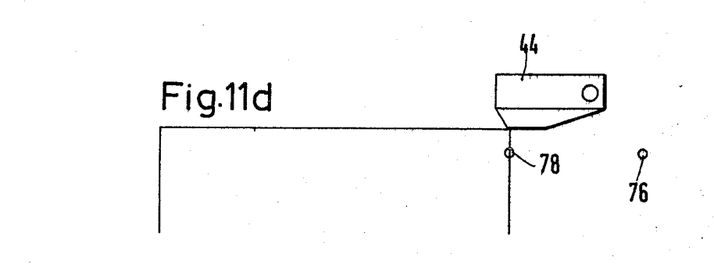
Figure 11E:
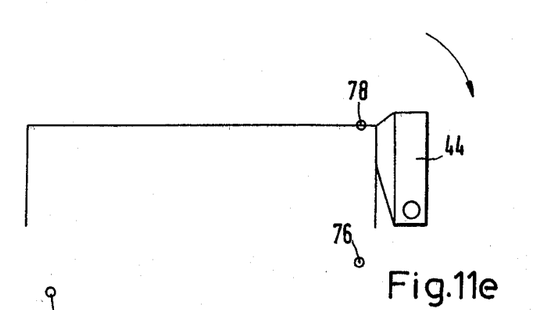

When the probe 76 reaches the next edge of the insulation glass panel 2 positioned in direction x, as is indicated in FIG. 11c, the pump drive and, wih some delay, also the drive of the carriage 82, slow down gradually in proportion with each other, until the carriage 82 reaches its inching speed with which it then proceeds to the corner of the insulation glass panel, driven by only a small impulse by the pump. As soon as the second probe 78 reaches the edge of the insulation glass panel, as indicated in FIG. 11d, the pump drive and the propulsion device 104 are switched off. The nozzle 44 is now positioned at the corner of the insulation glass panel. Then the rotation device 80 is disengaged, whereby the tooth 136 is withdrawn by means of the piston and cylinder unit 138. At the same time the motor 118 is started, whereby the index panel 120 is rotated around the axle 122, and thus the nozzle 44 is oriented toward the position indicated in FIG. 11e. The notch 142 near the shaft of the motor 118 triggers the end switch 140, whereby the tooth 136 is engaged into the notch 134 by means of the piston and cylinder unit. The probes 76 and 78 are switched off during the rotation procedure, but they are switched on again after the completion of the rotation procedure, so that they come in contact with the insulation glass panel 2 and trigger the program control unit in the manner described above, whereby the steering dimension b now directs the motion of the bridge 84 and thus also of the motor 90. The steering procedures are repeated at the two other corners of the insulation glass panel, whereby the program control unit provides a negative steering dimension b respectively to motors 106 and 90. The supply device 144 and the conveying device 146 are in continuous operation and maintain a well-determined pressure inside the conduit 150, a pressure that is regulated by the pressure gauge 156.

Figure 11F:
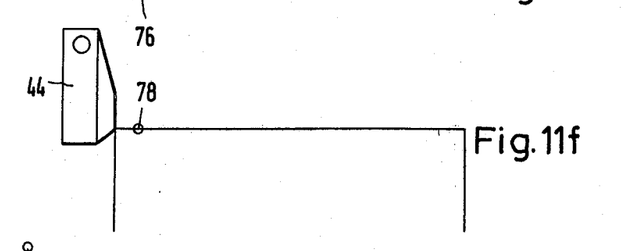
Figure 11G:
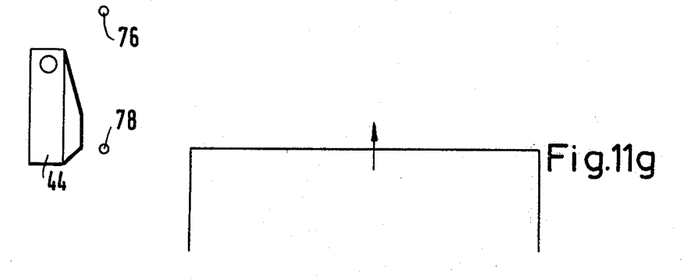
Figure 11H:
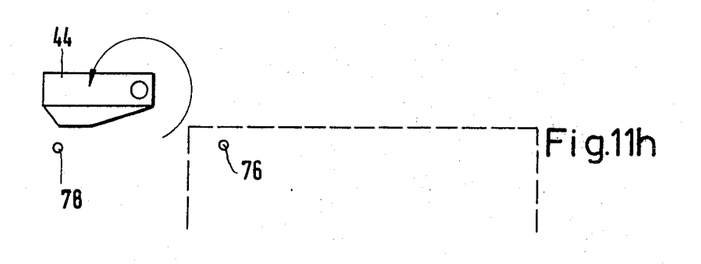

As soon as the nozzle 44 reaches the last corner of the insulation glass panel 2, as is illustrated in FIG. 11f, and thus as the probe 80 passes by the now sealed edge, the motor 90 of the bridge 84 is then stopped, the pump 116 is switched off, the valve 152 is closed and the probes 76 and 78 are switched off. Then the motor 106 of the carriage 82 is switched on, in order to bring back the nozzle 44 to the position indicated in FIG. 11g according to the transversal direction y. At the same time the propulsion device 6 of the conveying device 4 is disengaged, so that the insulation glass panel can be conveyed further. The bridge 84 and the carriage 82 advance further, and the rotation device 80 rotates the nozzle 44 counterclockwise to an angle of 270°, so that the nozzle—as is indicated in FIG. 11h—reaches its inoperative position. At the same time the impact elements 12 and 22 of the impact devices 10 and 20 are lifted. At this stage, the mechanism is ready to receive a new insulation glass panel 2.

Figure 12:
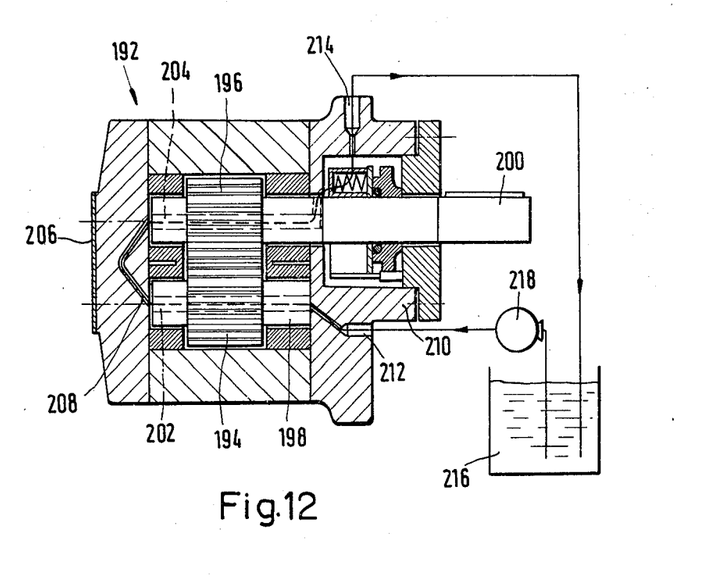
FIG. 12: a longitudinal section and a diagrammatic representation of a gear pump with rinsing device.

FIG. 12 represents a cog wheel pump 192 which is particularly well adapted for mixed sealing compounds consisting of two components. The cog wheels 194 and 196 are attached to the shafts 198 and 200, which are equipped with rinse ducts 202 and 204. The rinse ducts 202 and 204 are connected to each other, on the side 206 of the casing that is positioned away from the power source, through a conduit 208 that runs through the side 206 of the casing. On the casing side 210 that faces the power source, the rinse ducts 202 and 204 are connected on one side to a supply valve 212 and on the other side to a drain valve 214. While the pump 192 is operating, a rinsing liquid is constantly being fed from the container 216 through the pump 218 and the supply valve 212. The rinsing liquid flows through the pump to the drain valve 214, and flows out of the dead spaces, and loosens and rinses the filling compound emerging from the bearings. Then the rinsing liquid flows again from the drain valve 214 into the container 216.

To supplement the examples provided here, other variations of the mechanism are possible:

A processing device designed as an arm can also be developed in such a way that a nozzle be conveyed by means of one arm along the entire periphery of an insulation glass panel. For that purpose, the nozzle can be mounted on a rotation device in the manner illustrated in FIGS. 7 to 9.

Different arrangements are also possible with regard to the design of the nozzle. For instance, two or more nozzles or nozzle outlets can be positioned on top of each other, in order to simultaneously seal the edge seams of insulation glass consisting of three panels or more. It is further possible to provide a revolving head that supports several nozzles of different sizes, that would be appropriate, for instance, for insulation glass panels whose edge seams vary in width.

Other arrangements are possible with regard to the design of the various power sources. In particular, instead of electrical power sources, fluid driven power sources can be used, steered by an appropriate program.

The sealing compound supply device can also be designed differently. For instance, instead of the preferred volumetric dosage of sealing compound by means of a pump, a proper dosage can be obtained by means of a regulating valve. The sealing compound is preferably fed from a replaceable container. For practical purposes that replaceable container is mounted with the supply device very closely to the nozzle. This way the conduits, and therefore the conduit resistance, remain small. In particular, when a sealing compound with a high melting point is used, can a shorter conduit be heated more easily than a long one. The container is preferably mounted directly on the processing device which conveys the nozzle.

Different types of sealing compound can be applied with the type of mechanism described above. For instance, sealing compounds with a silicon base can be used. Sealing compounds consisting of two components can also be used, whereby a separate pump can be provided for each component and the mixing of the individual components follows their egression from the pumps. However, the individual components can also be mixed immediately before they are fed by the pump. The use of sealing compounds with a high melting point is also possible, whereby the individual parts that come in contact with the compound are also suitably heated.

We claim:

1. A mechanism for automatically sealing the joint of the four rectangular edges of multiple glazed units which comprises
   (a) conveying means for advancing the multiple glazed units along a conveying path,
   (b) a positioning device (10, 20) and a retaining device (30) provided at an operation site located in said conveying path by means of which devices (10, 20; 30) each of said advancing units (2) can be positioned and retained in an adjusted position in which two opposite edges extend in an adjusted direction at a predetermined angle to the conveying direction (x) of said conveying means,
   (c) a nozzle (44) fed with sealing compound by a supply device (144),
   (d) a movement device (82, 84) for moving said nozzle in said adjusted direction (x) and perpendicularly (y) to it, and
   (e) a rotation device (80), holding said nozzle (44) in a rotatable position to said movement device (82, 84), by means of which the nozzle (44) can be rotated four times to 90° with respect to said adjusted direction.

2. A mechanism as in claim 1, further comprising a locking device (132) for locking said nozzle (44) in each of its rotating positions at angles of 90° from each other.

3. A mechanism as in claim 2, further comprising two probes (76, 78) which are stationary with regard to said nozzle (44) and which are adapted to respond to the unit (2), one of which (76) precedes the nozzle (44) and is operative upon the passing by of the edge of the unit to initiate a throttling of the supply device (144) and a slowing down of the drive of said movement device (82, 84), and the other of which (78) bypasses (FIG. 11d) the edge of the unit when the nozzle (44) reaches the end of one side of the edge joint, and thus triggers the stopping of the supply and movement devices (144, 82, 84) and triggers the locking and rotation devices (132, 80).

4. A mechanism as in claim 1, wherein said predetermined angle is an angle of 0° to 90°, the edges of said unit in said adjusted position run respectively parallel and perpendicularly to said conveying direction (x), said movement device (82, 84) moves said nozzle (44) in the conveying direction and perpendicularly to it and said rotation device (80) rotates said nozzle (44) four times by 90° with respect to said conveying direction (x).

5. A mechanism as in claim 1, wherein said nozzle (44) is attached to an arm (124) that is positioned eccentrically with respect to the rotation axle (122) of the rotation device (80).

6. A mechanism as in claim 1, wherein said positioning device (10,20) is equipped with stop elements (12) that can be adjusted in two positions and that, in one of their positions, project into the conveying path of the conveying means (4) in such a way that the front edge of the unit (2) strikes against them and thereby is positioned in said adjusted position perpendicularly (y) to the conveying direction (x), and that in their (12) other positions are positioned outside the conveying path so as to free the edge joint (54) of the unit (2), which is retained by the retaining device (30), for the sealing, and to enable the sealed unit (2) to be further advanced by said conveying means (4) as the retaining device (30) is disengaged.

7. A mechanism as in claim 1, wherein said positioning device (10,20) is equipped with stop elements (22) that can be moved sideways into the conveying path of the conveying means (4), so as to push the unit (2) into a position in which the edges extend parallel and perpendicular (y) to the conveying direction (x).

8. A mechanism as in claim 1, wherein said retaining device (30) is equipped with suction plates (32) that can be applied to the unit (2).

9. A mechanism as in claim 1, wherein said movement device (82, 84) is equipped with a bridge (84) that overlaps over the conveying means (4) and moves in the conveying direction (x), and on whose (84) traverse, which is positioned perpendicular to the conveying direction (x), a carriage (82) is guided on which the nozzle (44) is mounted by means of the rotation device (80).

10. A mechanism as in claim 9, wherein the supply device (144) is equipped with a pump (116) and the carriage (82), the bridge (84) and the pump (116) are driven by motors that are controlled jointly.

11. A mechanism as in claim 1, wherein the supply device (144) is equipped with a pump (116), preferably a gear pump, which is controlled jointly with the movement device (82, 84).

12. A mechanism as in claim 11, wherein the pump (116) is fed by a container (146) maintained under pressure that contains the sealing compound (62).

13. A mechanism as in claim 11, wherein the sealing compound is a two-component adhesive and wherein the pump (116) is a gear pump (192) fed with the united two-component adhesive, said gear pump (116) having leak chambers (192) with openings communicating with a constantly fed rinsing liquid supply line (212) and a rinsing liquid drain line (214).

14. A mechanism as in claim 1, wherein the supply device is equipped with a regulating valve which is controlled jointly with the movement device.

15. A mechanism as in claim 1, wherein the supply device (144) is mounted in immediate vicinity of the nozzle (44) on the movement device (82,84).

16. A mechanism as in claim 1, wherein said nozzle (44) has at least two outlets (60), each of which is directed toward one of the two corner areas of the edge joint (54) cross section as the nozzle (44) moves along the periphery of said unit (2).

17. A mechanism as in claim 1, wherein several nozzles or nozzles outlets are mounted on the movement device for the purpose of sealing of multiple glazed units with several edge joints.

18. A mechanism as in claim 1, wherein said nozzle (44) is equipped with a guiding element (56) having a plane guiding surface (56) whose function it is to slide over the spacer (50) of the unit (2), and wherein the nozzle outlets (60) are positioned on an oblique surface (58) that is positioned at an angle with respect to said guiding surface (56) and that in the advance direction of the nozzle follows on said guiding surface (56).

19. A mechanism as in claim 18, wherein conduits or channels opening into the nozzle (44) outlets (60) lie in a plane that is approximately vertical with respect to the oblique surface (58).

20. A mechanism as in claim 18, wherein the oblique surface (58) is oriented at an angle of 10° to 25°, preferably 15°, with respect to the guiding surface.

21. A mechanism as in claim 18, wherein the guiding element (53) has an overrun pin (68) that precedes the guiding surface (56) in the direction of the motion, for the purpose of running over the inner surface of one of the two glass panes (46, 48) that border on the side of the edge joint (54) and of leading the nozzle (44) sideways.

22. A mechanism as in claim 21, wherein the overrun surface (70) of the overrun pin (68) is oriented at an angle of 2° to 10°, preferably 5°, with respect to the guiding surface (56).

23. A mechanism as in claim 21, wherein the surface of the overrun pin (68) that faces the spacer (50) of the unit (2) forms a free surface (72) which is inclined at an angle of 1° to 3°, preferably 2°, toward the guiding surface (56).

24. A mechanism as in claim 1, further comprising a device (44, 73) which measures the depth of the edge joint (54), which is mounted within reach of the nozzle (44) and which controls the sealing compound (62) supply to the nozzle (44) in proportion to the measured depth of the edge joint (54).

25. A mechanism as in claim 24, further comprising a device (44, 75) positioned within reach of the nozzle (44), which device measures the thickness of the sealing layer (62) applied to the edge joint, both, the device (44, 73) which measures the depth of the edge joint and the device (44, 75) which measures the thickness of the sealing layer being parts of a controlling device that controls the sealing compound supply (62) to the nozzle (44) in such a way that the thickness of the sealing layer (62) corresponds to the depth of the edge joint.

26. A mechanism as in claim 1, wherein the nozzle (44) is provided with a guiding element (56) having a guiding surface (56) whose function is to slide over the spacer (50), and wherein the nozzle (44) is part of the device (44, 73) that measures the depth of the edge joint (54), and supports a feeler (73) that precedes its (44) outlets (60) in its direction of movement, which feeler (73) runs along one of the edges or on the edges of the glass panes (46, 48) of the unit.

* * * * *